United States Patent [19]

Armbruster

[11] Patent Number: 4,523,701
[45] Date of Patent: Jun. 18, 1985

[54] COLLAPSIBLE AUTOMOTIVE CLOTHING HANGER

[76] Inventor: Curtis J. Armbruster, 2626 Groesback Ave., Lansing, Mich. 48912

[21] Appl. No.: 429,809

[22] Filed: Sep. 30, 1982

[51] Int. Cl.³ ............................................. A47J 51/10
[52] U.S. Cl. ...................................... 223/94; 211/87; 403/408
[58] Field of Search ............................ 248/305, 221.4; 224/42.45 A; 223/85, 92, 93, 94, 95, 96, 97; 403/408, 71, 252; 211/87

[56] References Cited

U.S. PATENT DOCUMENTS

| 735,624 | 8/1903 | Twitchell . | |
|---|---|---|---|
| 2,235,439 | 3/1941 | Lion | 105/354 |
| 2,267,558 | 12/1941 | Fernberg | 403/408 X |
| 2,557,537 | 6/1951 | Ellison | 224/42.45 |
| 3,219,241 | 11/1965 | Newton | 223/94 |
| 3,334,793 | 8/1967 | Anderson | 223/94 |
| 3,363,868 | 1/1968 | Okada | 248/317 |
| 3,386,589 | 6/1968 | Prete, Jr. | 211/118 |
| 3,424,418 | 1/1969 | Freedman et al. | 248/216 |
| 3,480,245 | 11/1969 | Gingher | 223/85 X |
| 3,733,655 | 5/1973 | Kolibar | 403/408 |

FOREIGN PATENT DOCUMENTS 4356 of 1902 United Kingdom .................. 223/94
965711 8/1964 United Kingdom .................. 223/94

Primary Examiner—Werner H. Schroeder
Assistant Examiner—Andrew M. Falik
Attorney, Agent, or Firm—Price, Heneveld, Huizenga & Cooper

[57] ABSTRACT

An extensible and collapsible clothing hanger for automotive vehicles is provided comprising first and second elongate arms having one end thereof mounted for pivotal motion relative to the headliner of a vehicle. The first and second arms are upwardly pivotable to a storage position against, and in some cases flush with, the headliner of the vehicle. Interfering surfaces are provided which define a stop that limits the pivotable motion of the first and second arms downwardly to create a use position. In the use position, the first and second arms provide an opposing pair of downwardly sloping surfaces which are suitable for supporting an article of clothing thereon such as a sport coat, jacket or the like. An arrangement is provided for removably mounting the coat hanger to the headliner of the vehicle so that the hanger can be removed from the headliner to facilitate the draping of clothing thereon. The hanger is mounted on a base which is adapted for mounting in place of the hanger hook normally provided in the vehicle headliner. A hanger hook is also mounted on the base to replace the hanger hook normally provided in the headliner.

46 Claims, 16 Drawing Figures

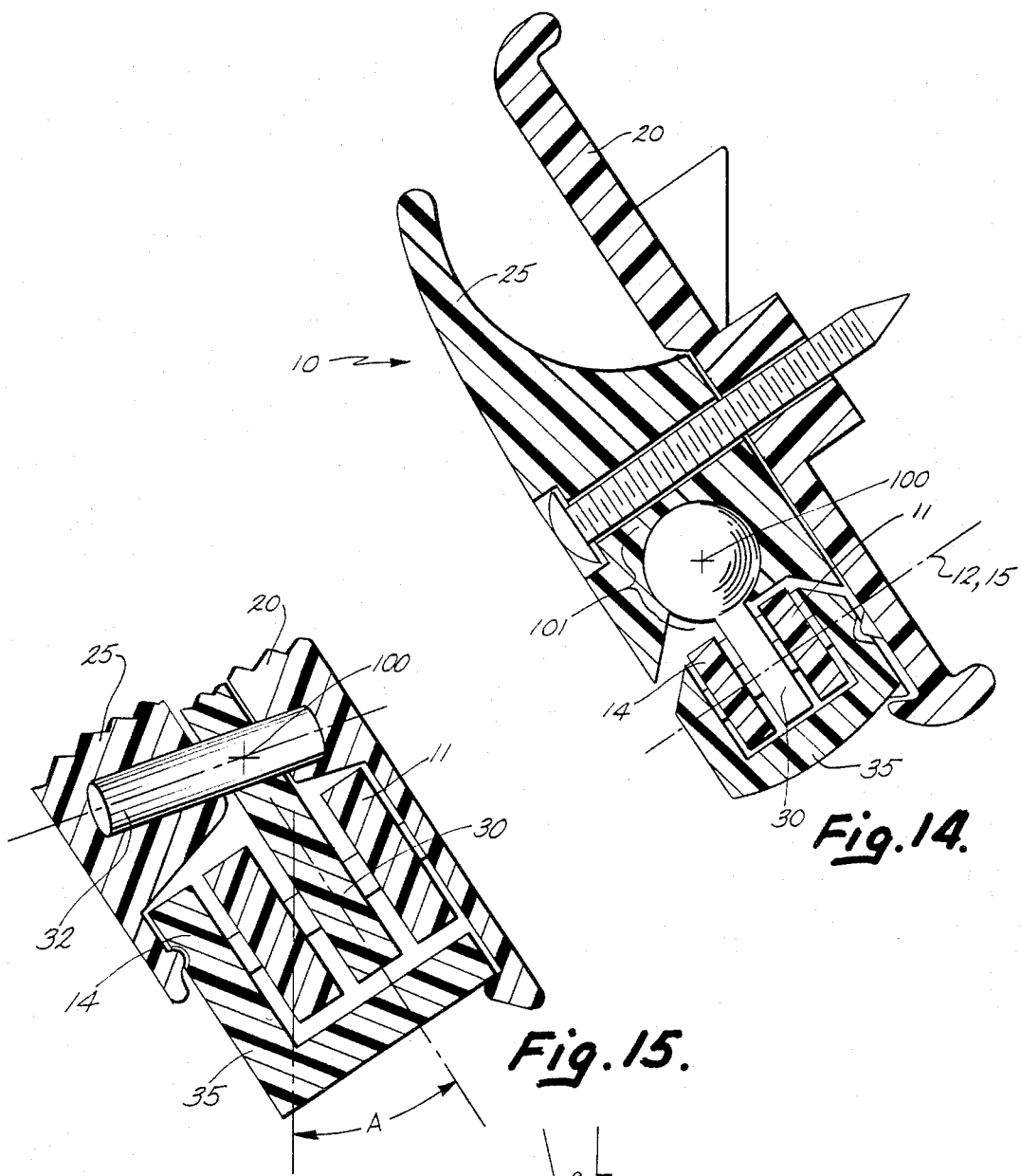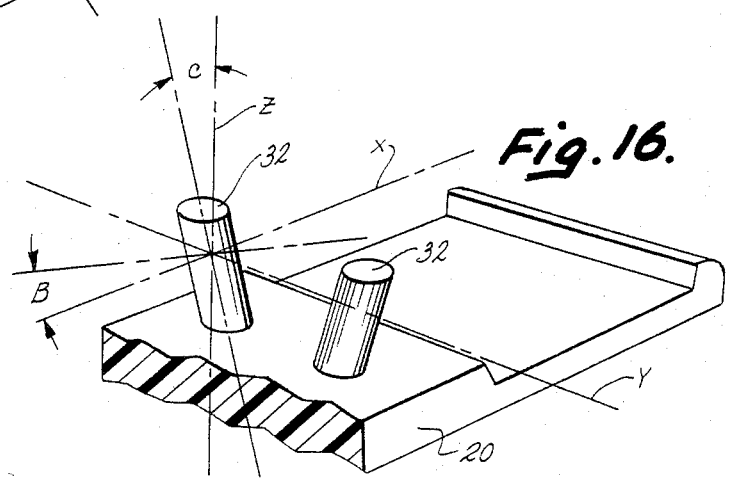

COLLAPSIBLE AUTOMOTIVE CLOTHING HANGER

BACKGROUND OF THE INVENTION

The invention relates generally to collapsible hangers and, more specifically, is directed to a collapsible and extensible hanger adapted for mounting in the headliner of an automotive vehicle.

Hanger hooks are commonly provided in the headliner of automotive vehicles, typically these hanger hooks are disposed above and to the left and right of the rear seat of the vehicle. On long trips these hooks are used to store clothing in the back seat and it is common for businessmen to leave a coat hanger on one of these hooks for storing a sport coat or suit jacket and preventing its wrinkling while he is driving. Although this practice is common, use of a loose coat hanger in this manner presents a potentially hazardous situation if the vehicle is involved in an accident.

Collapsible and folding hangers are found in the prior art. Collapsible hangers are characterized as being extensible and collapsible from use to storage positions, the hanger folding into itself somewhat to create a substantially smaller package during storage. Folding hangers, on the other hand, are characterized as hangers which are hinged or otherwise simply pivotable upwardly to a storage position that is out of the way. Prior art hangers of the folding variety are found in the prior art which are adapted for use in automotive vehicles. These structures normally comprise a conventionally-shaped wire hanger, or the like, which is pivotally mounted or hinged to a bracket which is adapted for mounting on the headliner of a vehicle. Problems with such prior art folding automotive hangers stem from the fact that they present hazardous projections on the interior of the vehicle which cannot meet modern head impact criteria, which are designed to protect the occupants of the vehicle during an accident. Furthermore, the construction of these prior art folding vehicular hangers is expensive and aesthetically displeasing.

SUMMARY OF THE INVENTION

According to the present invention, these and other problems in the prior art are solved by provision of a collapsible and extensible clothing hanger that can be integrally mounted in a vehicle headliner comprising a first arm mounted for pivotal motion relative to a first axis on the headliner of the vehicle, and a second arm mounted for pivotal motion relative to a second axis on the headliner of the vehicle. The first and second arms are elongate in shape with one end of the arms pivotally mounted to the headliner of the vehicle and the other ends of the arms pinned to a generally horizontally extending tie bar. The hanger is thus articulated and truly collapsible upon itself with the first and second arms being upwardly pivotable to a storage position, completely out of sight, against, and in some cases, completely flush with the headliner of the vehicle. Interfering surfaces are provided which define a stop which limits the downward rotation of the first and second arms, the first and second arms being pivotable downwardly to a use position, which provides an opposing pair of downwardly sloping surfaces that are suitable for supporting clothing thereon. The hanger includes a base which is adapted for mounting in place of the hanger hook normally provided above the rear seat in the headliner of an automotive vehicle. The hanger may also include a hanger hook which replaces the hanger hook normally provided in the headliner of the vehicle. A latching arrangement is provided which renders the hanger removable from the hanger base so that the hanger can be effectively removed from the headliner of the vehicle to facilitate the draping of articles of clothing thereon. The hanger is formed from molded plastic components and is collapsible upon itself into a storage position that is out of harms way so that the device is completely compatible with modern head impact criterion.

BRIEF DESCRIPTION OF THE DRAWINGS

FIG. 14 is a sectional view of another embodiment of the collapsible hanger of the present invention.

FIG. 15 is a partial sectional view of another embodiment of the collapsible hanger of the present invention.

FIG. 16 is a partial perspective view of the base member and pivot posts of the embodiment of the collapsible hanger illustrated in FIG. 15.

DESCRIPTION OF THE PREFERRED EMBODIMENTS

Figure 1:
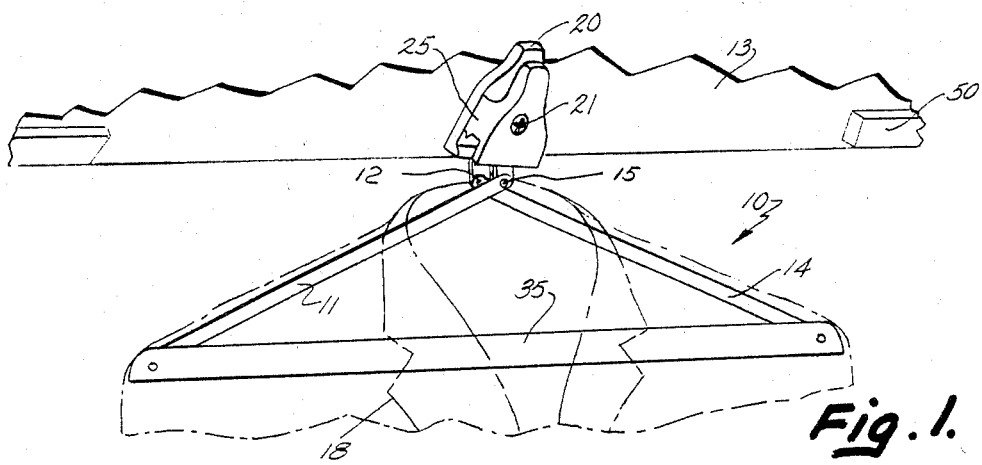
FIG. 1 is a perspective view of the collapsible hanger of the present invention installed in the headliner of an automotive vehicle. The hanger is illustrated in the deployed position with a sport coat or jacket illustrated in phantom thereon.
Figure 2:
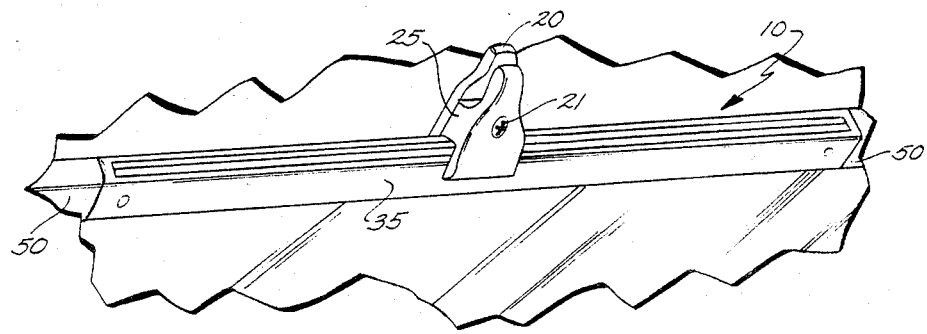
FIG. 2 is a perspective view of the collapsible hanger of the present invention illustrated in the stored position on the headliner of an automotive vehicle.
Figure 3:
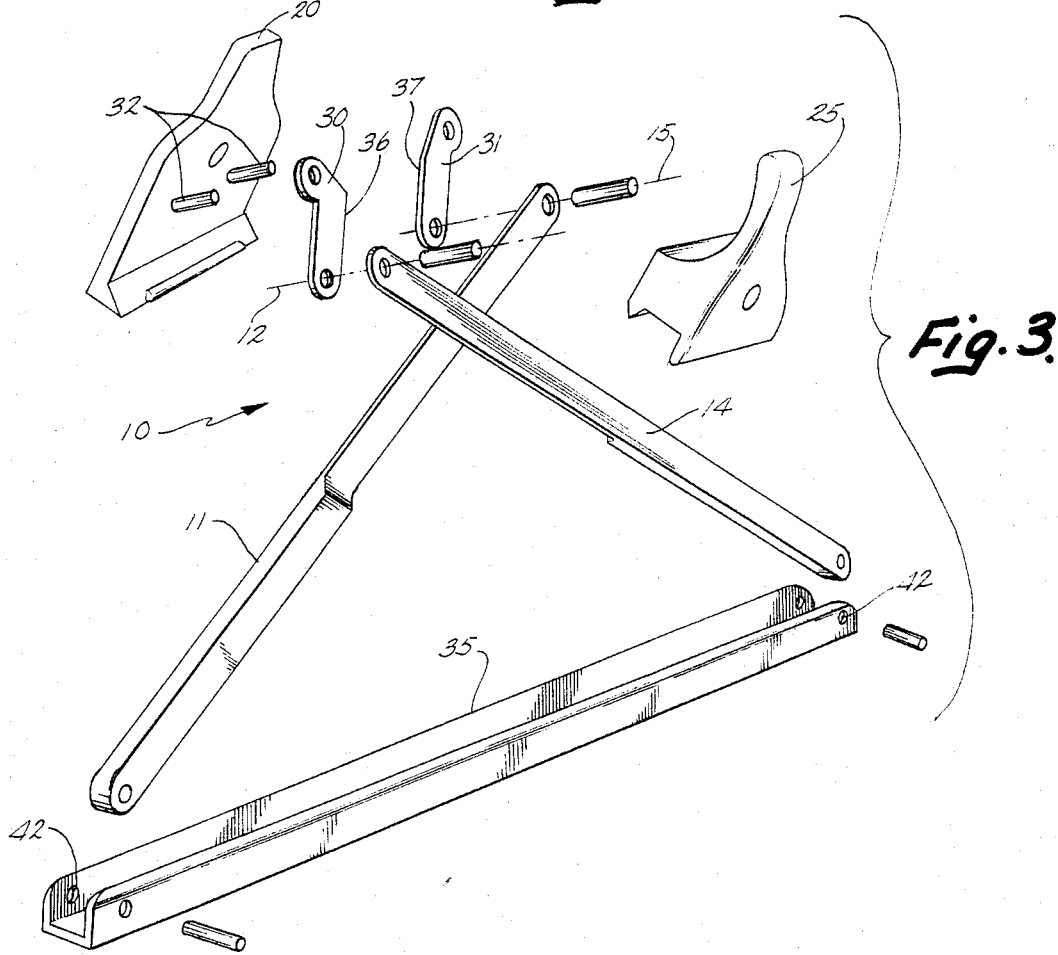
FIG. 3 is an exploded assembly of one embodiment of the collapsible hanger of the present invention.

With reference now to the figures, and in particular, FIGS. 1–3, a collapsible hanger constructed according to the present invention is generally illustrated at 10. The hanger 10 comprises a first arm 11 mounted for pivotal motion relative to a first axis 12 and the headliner of the vehicle at 13. A second arm 14 is mounted for pivotal motion relative to a second axis 15 and the headliner of the vehicle 13. The first and second pivotable arms 11 and 14 are pivotable upwardly to a storage position against or flush with the headliner of the vehicle as illustrated in FIG. 2. A stop arrangement for limiting the downward travel of the first and second arms is provided such that the first and second arms are downwardly pivotable to a use position illustrated in FIG. 1, where the first and second arms 11 and 14 provide an opposing pair of downwardly sloping surfaces which are suitable for supporting clothing thereon, such as a sport coat or jacket, illustrated in phantom at 18 in FIG. 1.

As best illustrated in FIGS. 1 and 2, the collapsible hanger 10 of the present invention further comprises a base 20, which is adapted for mounting on the headliner 13 of the vehicle in the position normally reserved for a hanger hook. Such hanger hooks are normally provided on the headliner of an automotive vehicle above and to the left and right of the rear seat of the vehicle. The base 20 is secured to the headliner of the vehicle with a machine screw or sheet metal screw 21 of the type normally used to secure a hanger hook to the headliner. Furthermore, the base 20 may have a hanger hook 25 mounted thereon as a substitute for the hanger hook which is replaced by the base 20. Thus, use of the collapsible hanger of the present invention does not interfere with the use of other implements such as large extensible clothes hangers which extend between hanger hooks on opposing sides of the rear seat or conventional clothes hangers.

In the embodiment of the invention presently under consideration, and illustrated in FIG. 3, the first and second arms 11 and 14 are pivotally mounted to the base 20 via third and fourth pivotable arms or links 30 and 31. In this case, the first and second arms 11 and 14 cross one another and are pinned to the ends of the third and fourth arms 30 and 31, respectively. The opposite ends of the second and third arms 30 and 31 are pinned to the base 20 via posts 32. The ends of the first and second elongate arms 11 and 14, which are opposite the third and fourth arms 30 and 31, are pinned to a generally horizontally extending tie bar 35. In this case, the stop means which defines the use position for the hanger 10 comprises interfering surfaces 36 and 37 on third and fourth arms or links 30 and 31, respectively, and the tie bar 35, which is pinned to opposing ends of the first and second pivotable arms 11 and 14. When the horizontal tie bar 35 is drawn downwardly to extend the hanger to the use position, the first, second, third and fourth pivotable arms extend downwardly until the interfering surfaces 36 and 37 abut. Further pivotable motion of the first and second pivotable arms 11 and 14 downwardly about the first and second axes 12 and 15 is then prevented by the horizontal tie bar 35 extending between the first and second arms. As best illustrated in FIG. 1, in the use position, the first and second arms 11 and 14 and the horizontal tie bar 35 define a generally triangular-shaped hanger when the horizontal tie bar 35 and the arms 11 and 14 are pulled downwardly to the use position.

Figure 6:
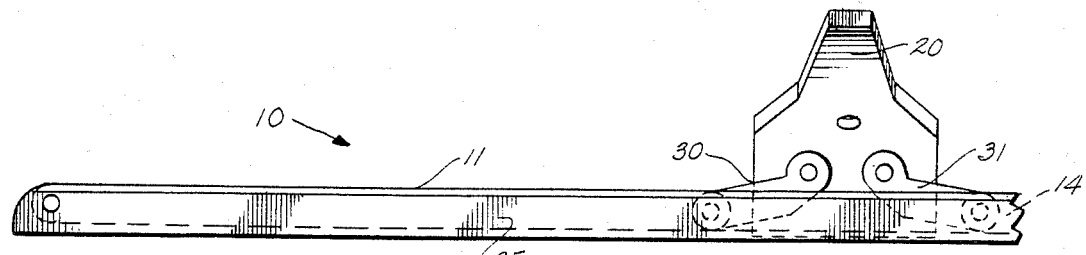
FIG. 6 is a partial elevational view of the hanger illustrated in FIGS. 4 and 5 with the folding arms completely collapsed in the stored position.
Figure 5:
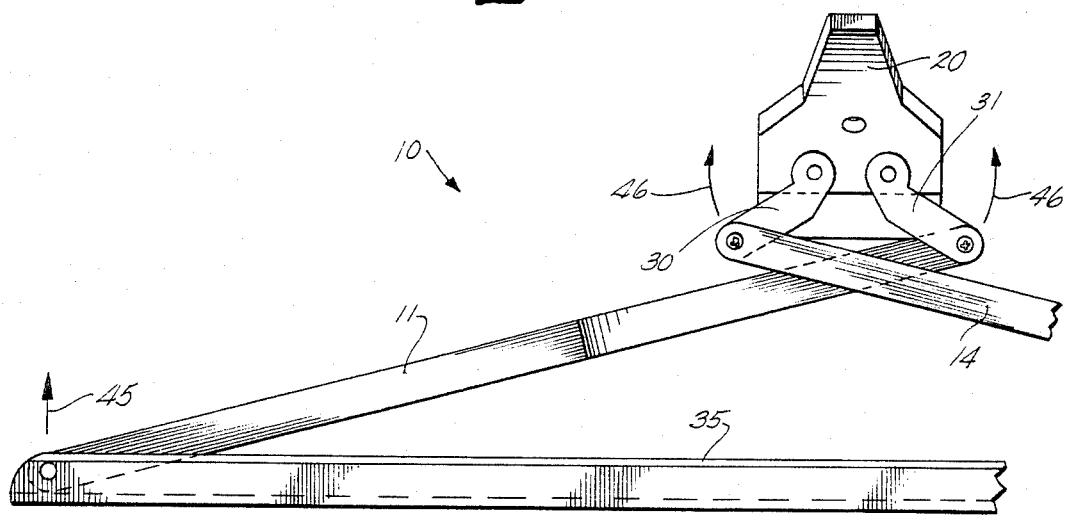
FIG. 5 is a partial elevational view of the hanger illustrated in FIG. 4 with the folding arms of the hanger partially collapsed.
Figure 4:
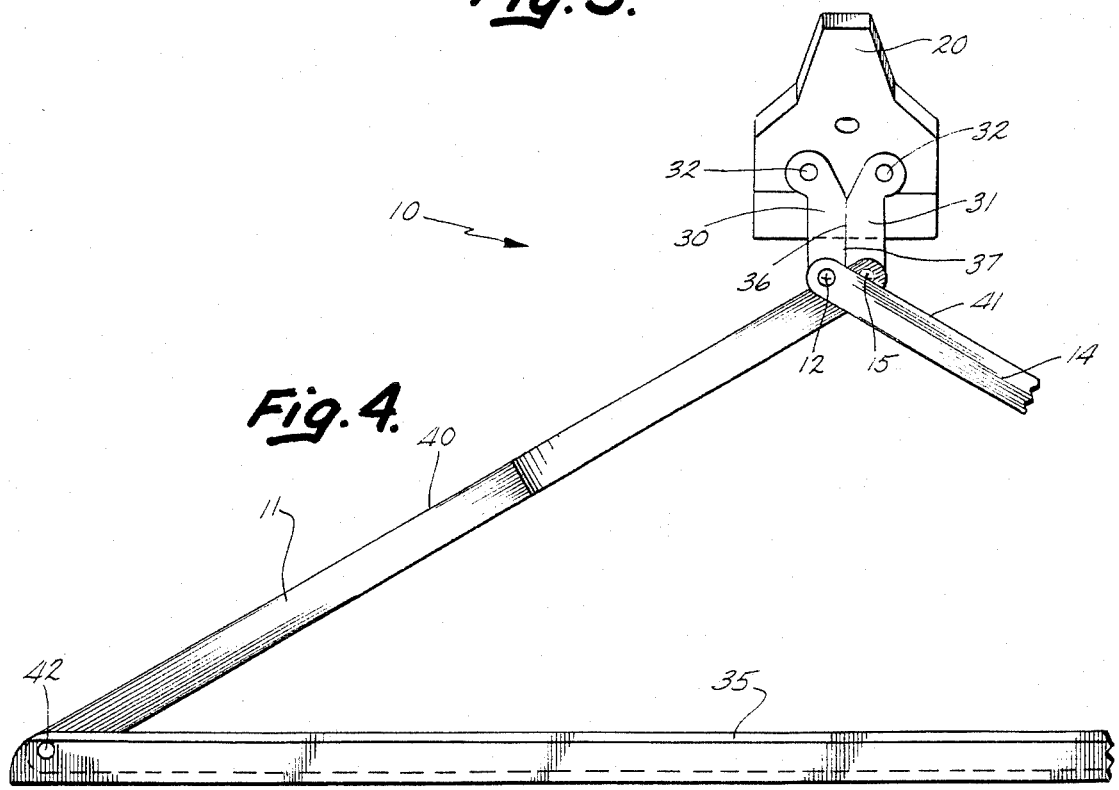
FIG. 4 is an elevational view of the hanger illustrated in FIG. 3 with the hanger hook removed and the hanger extended to the use position.

With reference now also to FIGS. 4–6, the hanger 10 is sequentially illustrated in extended semi-collapsed, and fully-collapsed positions, respectively, with the hanger hook 25 removed therefrom so that the articulated motion of the first, second, third and fourth arms 11, 14, 30 and 31 are better illustrated. With particular reference now to FIG. 4, the hanger 10 is illustrated in the deployed or use position. In this position, the first and second arms 11 and 14 define a pair of downwardly sloping opposed surfaces 40 and 41, which are suitable for hanging clothing thereon. The first and second arms 11 and 14 are maintained in this position by the interengagement of interfering surfaces 36 and 37 of the third and fourth pivotal arms 30 and 31, which prevents further rotation of the third and fourth arms and thus the first and second arms connected thereto about the posts 32, which pin the arms to the base 20. Further rotation of the first and second arms 11 and 14 downwardly about the first and second axes 12 and 15, is further prevented by the tie bar 35, which engages opposing ends of the first and second pivotable arms 11 and 14 at 42. With reference now to FIG. 5, it is illustrated that the hanger 10 is collapsible upwardly by applying pressure to the horizontally extending tie bar 35, which pivots the first and second arms 11 and 14 upwardly in the direction of the arrows 45 and the third and fourth arms 30 and 31 upwardly in the direction of the arrows 46. With reference now to FIG. 6, it is illustrated that when sufficient upward force is applied to the horizontally extending tie bar 35, eventually the tie bar 35 will bottom against the lower surfaces of the pivotable arms and the base 20 to define a storage position for the hanger 10. In this case, the horizontal tie bar 35 is provided with a generally U-shaped cross section such that the first, second, third and fourth pivotable arms 11, 14, 30 and 31 are neatly nested within the U-shaped horizontal tie bar 35 in the storage position. As best illustrated, in FIGS. 1 and 2, the exterior of the horizontal tie bar 35 can be provided with a cross section that matches the trim molding 50 on the edge of the headliner 13, such that when the hanger 10 is pushed upwardly into the storage position, the hanger literally appears to withdraw flush and into the headliner of the vehicle.

Figure 9:
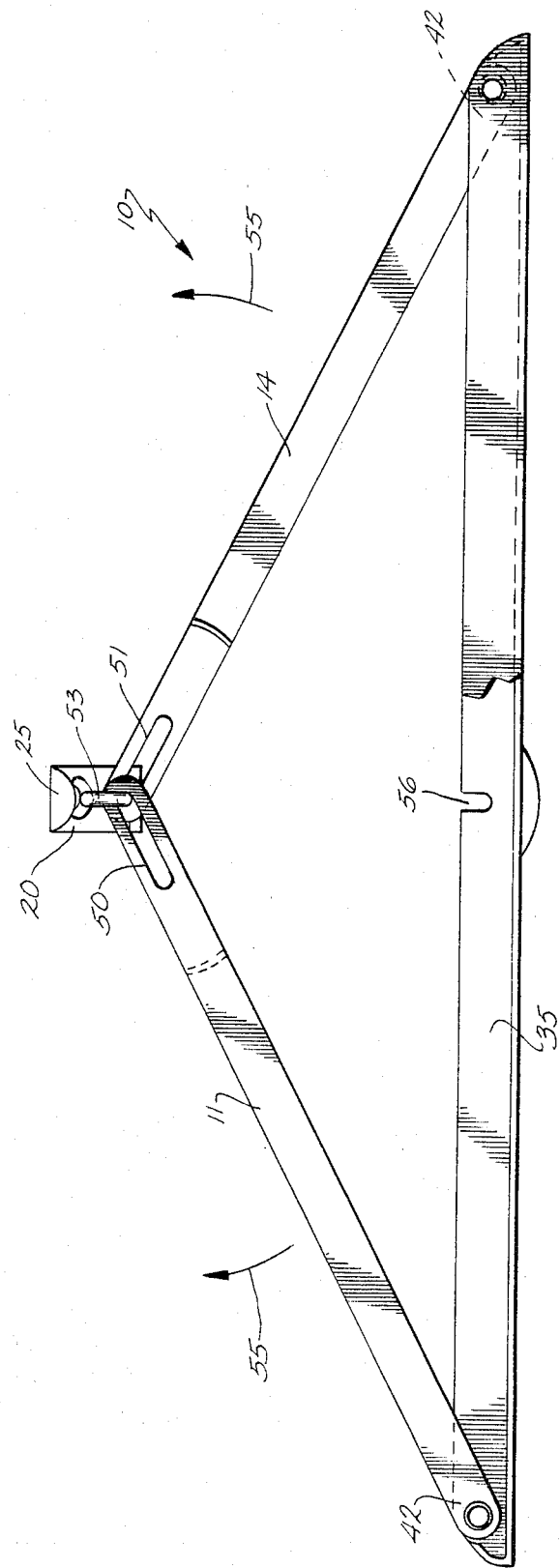
FIG. 9 is a partial elevational view of another embodiment of the collapsible hanger of the present invention.

With reference now to FIG. 9, another embodiment of the collapsible hanger of the present invention is generally illustrated at 10. In this case, the first and second arms 11 and 14 are mounted for both pivotable and sliding motion relative to the base 20 and the headliner of the vehicle. This is accomplished by providing the first and second arms 11 and 14 with slots 50 and 51, which are pinned to the base 20 via link 53. Opposing ends 42 of the first and second arms 11 and 14 are similarly pinned to the horizontal tie bar 35. In this case, the use position illustrated in FIG. 9 is defined through interengagement of the ends of the slots 50 and 51 and the link 53 and engagement of the ends 42 of the first and second arms 11 and 14 with the horizontal tie bar 35. The hanger 10 is retracted upwardly into a storage position by applying upward pressure on the horizontal tie bar 35 which causes the link 53 to slide downwardly in the slots 50 and 51, permitting the first and second arms 11 and 14 to pivot upwardly in the direction of the arrows 55 until a storage position is reached with the first and second arms 11 and 14 neatly nested within the horizontal tie bar 35. In this case, the tie bar 35 is provided with an L-shaped cross section which only partially encompasses the arms 11 and 14, and which is provided with a notch at 56 for encompassing the lowermost depending end of link 53.

Figure 7:
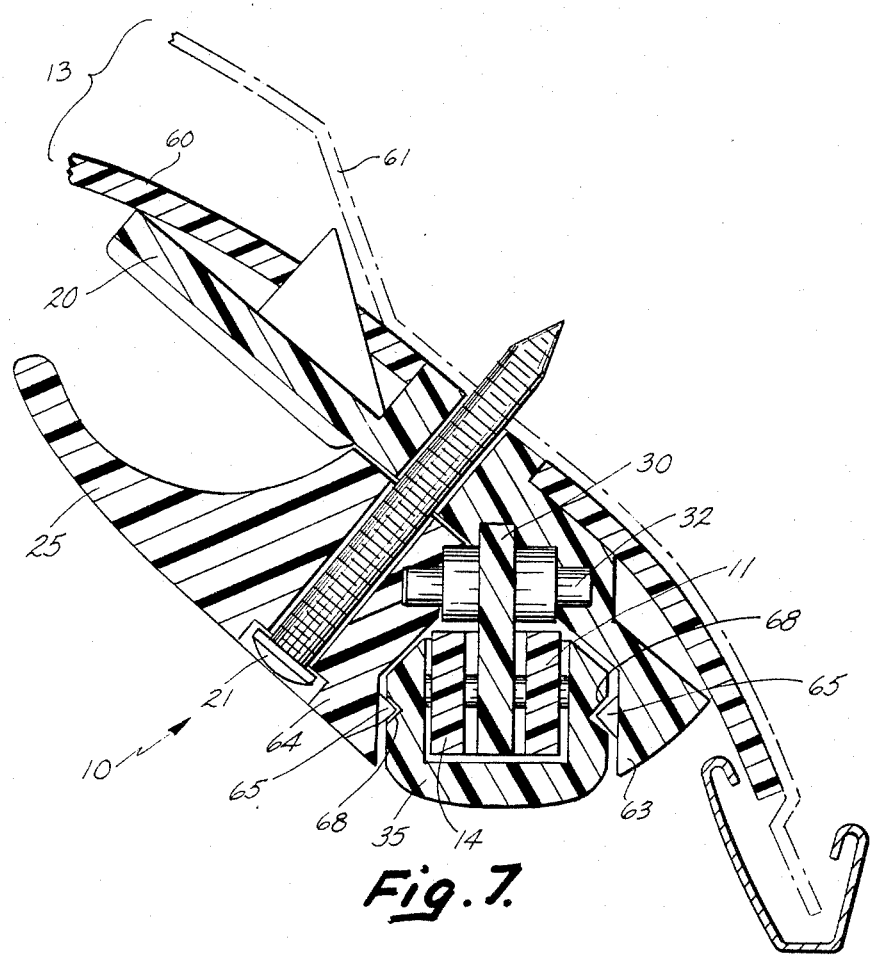
FIG. 7 is a sectional view of another embodiment of the collapsible hanger of the present invention.

With reference now to FIG. 7, another embodiment of the hanger of the present invention is generally illustrated at 10. The hanger 10 is illustrated on the headliner 13 of an automotive vehicle. The headliner 13 includes a cosmetic polymeric fabric or web 60 which covers sheet metal 61. In this case, a sheet metal screw 21 extends through the hanger hook 25 and the base 20 of the hanger 10 to engage the sheet metal 61. In the embodiment of the hanger illustrated in FIG. 7, first through third pivotable arms are provided which are similar in construction to the arms 11, 14, 30 and 31 illustrated in FIG. 3. The base 20 and the hanger hook 25 are provided with extensions at 63 and 64, respectively, which include projections 65 which face one another on opposing sides of the horizontally extending tie bar 35 when the tie bar is pushed upwardly to the storage position illustrated in FIG. 7. The projections 65 engage notches 68 disposed on the sides of the tie bar 35 to form a bifurcated spring clip arrangement that snap-locks the tie bar 35 in the stored position with the first through fourth pivotable arms neatly nested therein.

Figure 8:
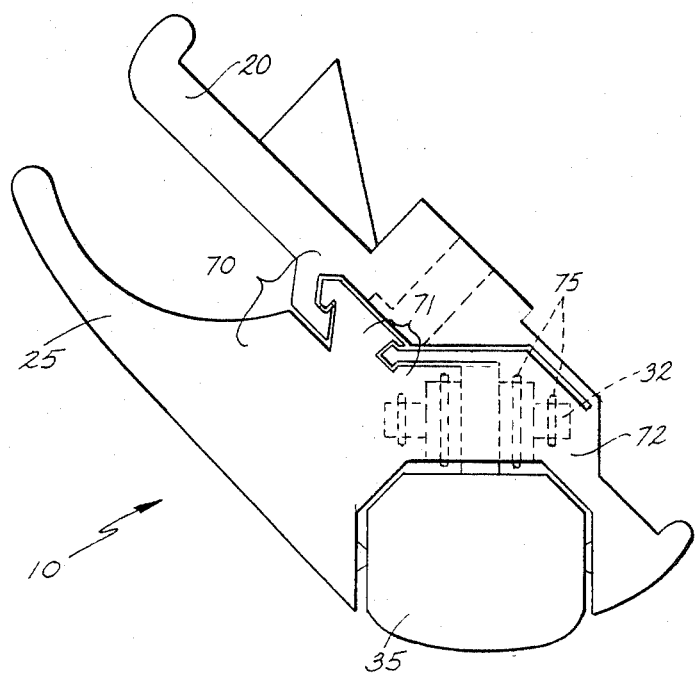
FIG. 8 is an end view of another embodiment of the collapsible hanger of the present invention.

With reference to FIG. 8, another embodiment of the hanger 10 of the present invention is illustrated. In this case, the base 20, hanger hook 25 and the pivotable arm assembly are snap-locked together with snap-locking structures 70 extending between the base 20 and the hook 25, snap-locking structure 71 extending between bearing cap cover 72 and hook 25 and annular ridges 75 which are disposed about the posts 32 for engaging annular grooves disposed in the hook 25 and the bearing cap 72 for snap-locking the hook 25 and bearing cap 72 theretogether.

Figure 10:
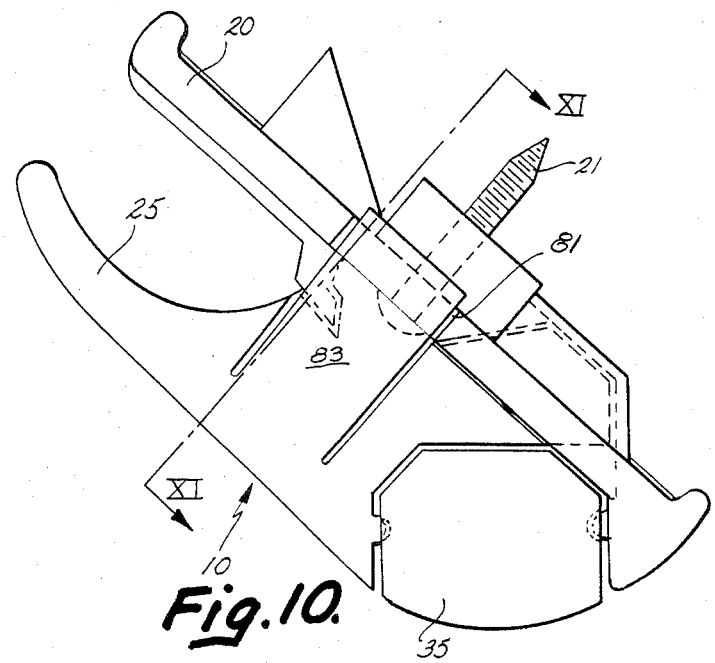
FIG. 10 is an end view of another embodiment of the collapsible hanger of the present invention.
Figure 11:
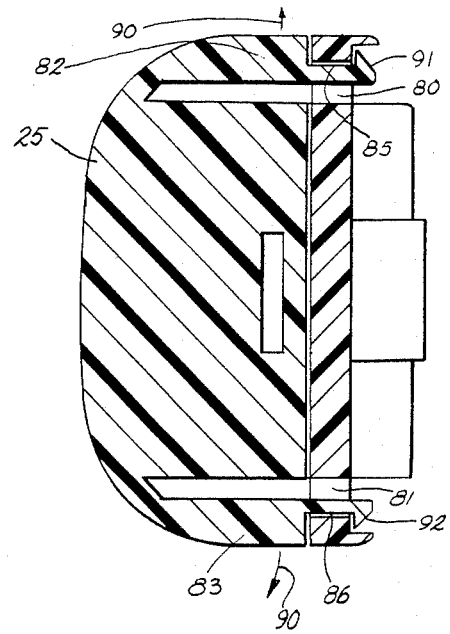
FIG. 11 is a sectional view of the collapsible hanger illustrated in FIG. 10, taken along line XI—XI in FIG. 10.

With reference now to FIGS. 10 and 11, another embodiment of the hanger 10 of the present invention is illustrated which features a hanger and hook subassembly including the hook 25 and the pivotable hanger assembly which is removably mounted or latched to the base 20. The base 20 is mounted on the headliner of the vehicle with fastener 21 in a fashion similar to previous embodiments. However, in preferred embodiments of the hanger, the hanger is removable from the headliner to facilitate the placement of clothing thereon for storage purposes. In this case, the base 20 is provided with a pair of apertures 80 and 81, and the hanger hook 25 is provided with first and second resilient arms 82 and 83 having first and second detents 85 and 86 disposed on the ends thereof for engaging the apertures 80 and 81, respectively. The detents 85 and 86 comprise notches disposed in the ends of resilient arms 82 and 83, respectively, and the resilient arms 82 and 83 spring bias the notches outwardly in the direction of the arrows 90 such that the notches engage the edges of apertures for securing the hanger hook and the pivotable arm assembly thereto. Preferably, the first and second resilient arms 82 and 83 are also provided with pointed ends including cam surfaces 91 and 92, respectively, which cam the resilient arms inwardly in opposition to the arrows 90 during insertion of the ends of the resilient arms in apertures 80 and 81. This greatly facilitates insertion of the ends of the arms 82 and 83 in the apertures 80 and 81 and engagement of the edges of the apertures by detents 85 and 86. Preferably, the first and second resilient arms 82 and 83 are disposed on opposing sides of the hanger hook 25 such that the first and second arms are compressible between a thumb and a forefinger of the user to facilitate mounting and removal of the hanger hook and pivotable hanger arm assembly to the base 20.

Figure 12:
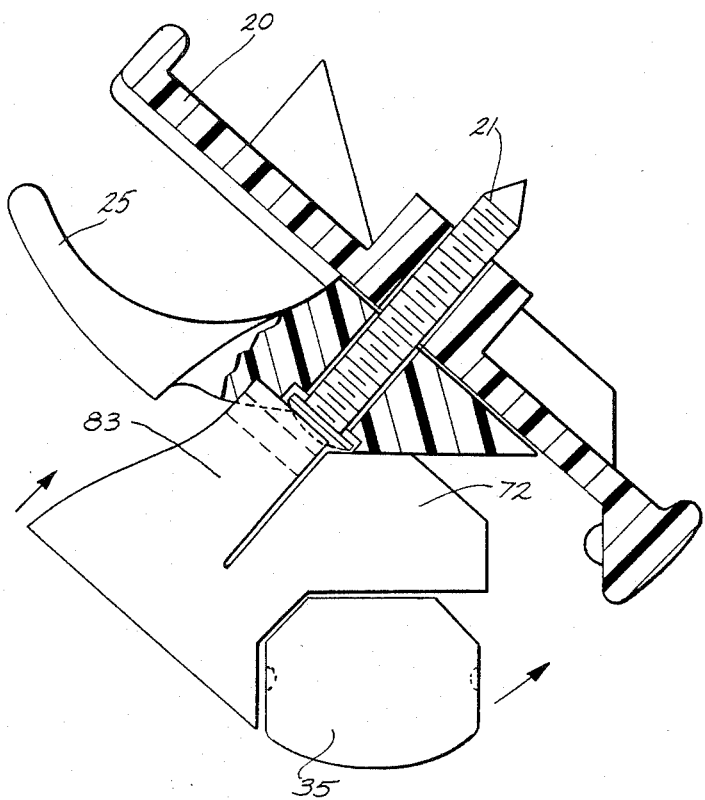
FIG. 12 is an end view, partially in section, of another embodiment of the collapsible hanger of the present invention.
Figure 13:
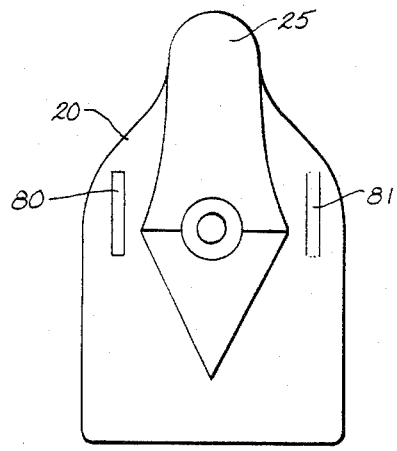
FIG. 13 is a front view of the hook and base assembly of the collapsible hanger illustrated in FIG. 12.

With reference now to FIGS. 12 and 13, another embodiment of the hanger of the present invention is generally illustrated at 10. In this case, both the hanger hook 25 and the base 20 are connected to the headliner of the vehicle via machine or sheet metal screw 21 in a fashion similar to that previously disclosed. However, in this case, the pivotable arm structure including horizontal tie bar 35 includes first and second resilient arms such as the arm 83, illustrated in FIG. 12, which engage first and second apertures 80 and 81, illustrated on the base 20 in FIG. 13. In this case, only the pivotable hanger arm structure and the bearing cap 72 are releasably mounted to the base 20.

With reference now to FIG. 14, an embodiment of the hanger of the present invention is generally illustrated at 10, which features a means for providing for the pivotal motion of the first through fourth pivotable arms and the tie bar about a third axis 100 which extends in a direction generally transverse to the pivot axes 12 and 15 of the first and second arms 11 and 14. In this case, the means for providing this additional pivotal motion about the transverse axis 100 comprises a ball and socket connection for each of the third and fourth pivotable arms 30 and 31, like the ball and socket connection illustrated at 101 and connected to third pivotable arm 30 in FIG. 14. Such a means for providing for pivotable rotation of the hanger about a transverse axis 100 may be desirable in some cases to tuck the pivotable arm assembly of the hanger 10 up further at a more remote angular orientation against the headliner of the vehicle.

With reference now to FIGS. 15 and 16, another arrangement for affecting pivotable motion of the arm subassembly about a transverse axis 100 is illustrated. In this case, the pins 32 are canted about first and second generally orthogonal axes Z and X, an amount equal to angles B and C, respectively. The apertures disposed in the ends of the second and third pivotable arms 30 and 31, which engage the posts 32 are similarly canted. This results in a total pivotable displacement of the arm subassembly about the transverse axis 100 an amount equal to the angle A illustrated in FIG. 20. The angle A equals the sum of the angles B and C in the case where the arms 30 and 31 traverse a 90° arcuate path from the deployed or use position to the storage position. Thus, for example, if it is desirable to pivot the tie bar 35 and associated pivotable arms an amount equal to 35° upwardly in the direction of the circumscribed angle A in FIG. 20 against the headliner of the vehicle, the posts 32 are canted about the Z and X axes 17.5° in the direction of the angles B and C, illustrated in FIG. 21. Similarly, the apertures disposed in the ends of the third and fourth pivotable arms 30 and 31 are canted in the direction of the angles B and C an amount approximately equal to 17.5°.

The above description is exemplary and that of the preferred embodiment only. Modifications will occur to those who make and use the invention. The true scope and spirit of the present invention is to be determined with reference to the appended claims and it is desired to include within the appended claims all such modifications of the invention that come within the proper scope of the claims.

The embodiments of the invention in which an exclusive property or privilege is claimed are defined as follows:

1. An extensible and collapsible clothing hanger for use in automotive vehicles comprising:
   a first arm mounted for pivotal motion relative to the headliner of a vehicle;
   a second arm mounted for pivotal motion relative to the headliner of a vehicle, said first and second arms being upwardly pivotable to a storage position against the headliner of the vehicle;

a third arm and a fourth arm both pivotally connected to the headliner, said first and second arms being pivotally connected to said third and fourth arms, respectively, said first and second arms overlapping and crossing each other; and stop means for limiting the downward travel of said first and second arms, said first and second arms being downwardly pivotable to a use position defined by said stop means, said first and second arms providing an opposing pair of downwardly sloping surfaces in said use position which are suitable for supporting clothing thereon.

2. The extensible and collapsible hanger of claim 1 further comprising a base, said first and second arms being pivotally mounted relative to said base, said base being adapted for mounting in place of a hanger hook normally provided in the headliner of a vehicle.

3. The extensible and collapsible hanger of claim 2 further comprising a hanger hook mounted on said base.

4. The hanger of claim 3 wherein said third and fourth arms are pinned to said hanger body with first and second posts.

5. The hanger of claim 4 wherein said first and second posts are canted to provide for pivotal motion of said arms and said tie bar about an axis extending transversely with respect to said posts when said hanger is moved from either said use position or said storage position.

6. The extensible and collapsible hanger of claim 1 wherein said first and second arms are upwardly pivotable to a storage position that is flush with the headliner of the vehicle.

7. The extensible and collapsible hanger of claim 1 wherein one end of each of said first and second arms are pivotally connected to said third and fourth arms, respectively, and the opposite ends of said first and second arms are pinned to a generally horizontal tie bar extending therebetween.

8. The extensible and collapsible hanger of claim 6 wherein said third and fourth arms are provided with interfering surfaces which abut when said first and second arms are pivoted downward to said use position, said interfering surfaces and said tie bar defining said stop means, whereby said first and second arms and said tie bar define a triangular-shaped hanger when said first and second arms are pivoted downward to said use position.

9. The extensible and collapsible hanger of claim 8 wherein said third and fourth arms are pinned to the headliner of a vehicle with first and second posts.

10. The extensible and collapsible hanger of claim 9 wherein said first and second posts are canted to provide for pivotal motion of said arms and said tie bar about an axis extending transversely with respect to said posts when said hanger is moved from either said use position or said storage position.

11. The extensible and collapsible hanger of claim 7 further comprising spring clip means mounted on the headliner for engaging said tie bar in a snap-lock fashion when said hanger is collapsed upwardly into said storage position.

12. The extensible and collapsible hanger of claim 1 further comprising a base adapted for mounting on the headliner of a vehicle and latch means for releasably securing said hanger on said base whereby said hanger can be effectively removed from the headliner to facilitate the draping of clothing thereon for storage purposes.

13. The extensible and collapsible hanger of claim 12 wherein said latch means comprises a pair of resilient arms cantilevered from said hanger, said resilient arms having detents disposed on the ends thereof for engaging a pair of apertures disposed on said base.

14. The extensible and collapsible hanger of claim 1 wherein said third and fourth arms are each provided with a ball and socket connection to the headliner of a vehicle.

15. The extensible and collapsible hanger of claim 1 further comprising means for providing for the pivotal motion of said first and second arms about an axis extending in a direction generally transverse to the pivot axes of said first and second arms.

16. A hanger for use on the headliner of an automotive vehicle comprising:

a base adapted for mounting on the headliner of a vehicle;

a hanger body comprising:
 (i) a first arm mounted for pivotal motion relative to the headliner of a vehicle;
 (ii) a second arm mounted for pivotal motion relative to the headliner of a vehicle; said first and second arms being upwardly pivotable to a storage position against the headliner of the vehicle;
 (iii) a third and a fourth arm both pivotally connected to the headliner, said first and second arms being pivotally connected to said third and fourth arm, respectively, said first and second arms overlapping and crossing each other; and
 (iv) stop means for limiting the downward travel of said first and second arms, said first and second arms being downwardly pivotable to a use position defined by said stop means, said first and second arms providing an opposing pair of downwardly sloping surfaces in said use position which are suitable for supporting clothing thereon; and means for removably mounting said hanger body on said base whereby said hanger body can be removed from the vehicle to facilitate the storage of clothing thereon comprising:
 (i) first and second resilient arms cantilevered from said hanger body;
 (ii) first and second apertures disposed in said base; and
 (iii) first and second detents disposed on said resilient arms for engaging said apertures in said base.

17. The hanger of claim 16 wherein said hanger body is collapsible upon itself for storage purposes against the headliner of a vehicle.

18. The hanger of claim 16 wherein said first and second detents comprise outwardly facing first and second notches disposed on said first and second resilient arms, respectively, said first and second arms spring biasing said first and second notches outwardly into engagement with the edges of said apertures for mounting said hanger body on said base.

19. The hanger of claim 18 wherein each of said first and second resilient arms is provided with cam surfaces for camming said first and second resilient arms inwardly to facilitate insertion of said first and second detents in said apertures.

20. The hanger of claim 18 wherein said first and second resilient arms are disposed on opening sides of said hanger body whereby said first and second arms are compressible between a thumb and a forefinger of a user to facilitate mounting and removal of said hanger body from said base.

21. The hanger of claim 16 wherein one of said base and said hanger body further comprises a hanger hook.

22. The hanger of claim 16 wherein one end of each of said first and second arms are pivotally connected to said third and fourth arms, respectively, and the opposite ends of said first and second arms are pinned to a generally horizontal tie bar extending therebetween.

23. The hanger of claim 22 wherein said third and fourth arms are provided with interfering surfaces which abut when said first and second arms are pivoted downward to said use position, said interfering surfaces and said tie bar defining said stop means, whereby said first and second arms and said tie bar define a triangular-shaped hanger when said first and second arms are pivoted downward to said use position.

24. The hanger of claim 16 wherein said third and fourth arms are provided ball and socket connections to said hanger body.

25. The hanger of claim 16 further comprising means for providing for the pivotal motion of said first and second arms about an axis extending in a direction generally transverse to the pivot axis of said first and second arms.

26. An extensible and collapsible clothing hanger for use in automotive vehicles comprising:
  a first arm having one end mounted for pivotal motion relative to the headliner of a vehicle;
  a second arm having one end mounted for pivotal motion relative to the headliner of a vehicle,
  said first and second arms being upwardly pivotable to a storage position against the headliner of the vehicle;
  a generally horizontally extending tie bar, the opposite ends of said first and second arms being pivotally connected to said tie bar, said tie bar extending therebetween; and
  stop means for limiting the downward travel of said first and second arms, said first and second arms being downwardly pivotable to a use position defined by said stop means, said first and second arms providing an opposing pair of downwardly sloping surfaces in said use position which are suitable for supporting clothing thereon.

27. The extensible and collapsible hanger of claim 26 further comprising a base, said first and second arms being pivotally mounted relative to said base, said base being adapted for mounting in place of a hanger hook normally provided in the headliner of a vehicle.

28. The extensible and collapsible hanger of claim 27 further comprising a hanger hook mounted on said base.

29. The extensible and collapsible hanger of claim 26 wherein said first and second arms are upwardly pivotable to a storage position that is flush with the headliner of the vehicle.

30. The extensible and collapsible hanger of claim 26 wherein said one ends of said first and second arms are mounted for sliding and pivotal motion relative to the headliner.

31. The extensible and collapsible hanger of claim 30 wherein said one ends of said first and second arms that are mounted for sliding and pivotal motion relative to the headliner are provided with slots, said first and second arms being pinned to the headliner through said slots.

32. The extensible and collapsible hanger of claim 31 wherein the ends of said slots and tie bar define said stop means, whereby said first and second arms and said tie bar define a triangular-shaped hanger when said first and second arms are pivoted downward to said use position.

33. The extensible and collapsible hanger of claim 26 further comprising spring clip means mounted on the headliner for engaging said tie bar in a snap-lock fashion when said hanger is collapsed upwardly into said storage position.

34. The extensible and collapsible hanger of claim 26 further comprising a base adapted for mounting on the headliner of a vehicle and latch means for releasably securing said hanger on said base whereby said hanger can be effectively removed from the headliner to facilitate the draping of clothing thereon for storage purposes.

35. The extensible and collapsible hanger of claim 34 wherein said latch means comprises a pair of resilient arms cantilevered from said hanger, said resilient arms having detents disposed on the ends thereof for engaging a pair of apertures disposed on said base.

36. The extensible and collapsible hanger of claim 26 further comprising means for providing for the pivotal motion of said first and second arms about an axis extending in a direction generally transverse to the pivot axes of said first and second arms.

37. A hanger for use on the headliner of an automotive vehicle comprising:
  a base adapted for mounting on the headliner of a vehicle;
  a hanger body comprising:
    (i) a first arm having one end mounted for pivotal motion relative to the headliner of a vehicle;
    (ii) a second arm having one end mounted for pivotal motion relative to the headliner of a vehicle;
    (iii) said first and second arms being upwardly pivotable to a storage position against the headliner of the vehicle;
    (iv) a generally horizontally extending tie bar, the opposite ends of said first and second arms being pivotally connected to said tie bar, said tie bar extending therebetween; and
    (v) stop means for limiting the downward travel of said first and second arms, said first and second arms being downwardly pivotable to a use position defined by said stop means, said first and second arms providing an opposing pair of downwardly sloping surfaces in said use position which are suitable for supporting clothing thereon; and
  means for removably mounting said hanger body on said base whereby said hanger body can be removed from the vehicle to facilitate the storage of clothing thereon comprising:
    (i) first and second resilient arms cantilevered from said hanger body;
    (ii) first and second apertures disposed in said base; and
    (iii) first and second detents disposed on said resilient arms for engaging said apertures in said base.

38. The hanger of claim 37 wherein said hanger body is collapsible upon itself for storage purposes against the headliner of a vehicle.

39. The hanger of claim 37 wherein said first and second detents comprise outwardly facing first and second notches disposed on said first and second resilient arms, respectively, said first and second arms spring biasing said first and second notches outwardly into engagement with the edges of said apertures for mounting said hanger body on said base.

40. The hanger of claim 39 wherein each of said first and second resilient arms is provided with cam surfaces for camming said first and second resilient arms inwardly to facilitate insertion of said first and second detents in said apertures.

41. The hanger of claim 39 wherein said first and second resilient arms are disposed on opposing sides of said hanger body whereby said first and second arms are compressible between a thumb and a forefinger of a user to facilitate mounting and removal of said hanger body from said base.

42. The hanger of claim 37 wherein one of said base and said hanger body further comprises a hanger hook.

43. The hanger of claim 37 wherein said one ends of said first and second arms are mounted for sliding and pivotal motion relative to the headliner.

44. The hanger of claim 43 wherein said one ends of said first and second arms that are mounted for sliding said pivotal motion relative to the headliner are provided with slots, said first and second arms being pinned to said hanger body through said slots.

45. The hanger of claim 44 wherein the ends of said slots and said tie bar define said stop means, whereby said first and second arms and said tie bar define a triangular-shaped hanger when said first and second arms are pivoted downward to said use position.

46. The hanger of claim 37 further comprising means for providing for the pivotal motion of said first and second arms about an axis extending in a direction generally transverse to the pivot axes of said first and second arms.

* * * * *